(12) United States Patent
Falk

(10) Patent No.: US 12,301,006 B2
(45) Date of Patent: May 13, 2025

(54) CONVERTER APPARATUS AND OPERATING METHOD

(71) Applicant: SMA Solar Technology AG, Niestetal (DE)

(72) Inventor: Andreas Falk, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 164 days.

(21) Appl. No.: 17/751,788

(22) Filed: May 24, 2022

(65) Prior Publication Data
US 2022/0285946 A1    Sep. 8, 2022

Related U.S. Application Data

(63) Continuation of application No. PCT/EP2020/082419, filed on Nov. 17, 2020.

(30) Foreign Application Priority Data

Nov. 28, 2019    (DE) ...................... 10 2019 132 336.3

(51) Int. Cl.
*H02J 3/34*    (2006.01)
*H02J 3/16*    (2006.01)
(Continued)

(52) U.S. Cl.
CPC .................. *H02J 3/34* (2013.01); *H02J 3/16* (2013.01); *H02J 3/32* (2013.01); *H02M 5/16* (2013.01); *H02J 3/381* (2013.01); *H02J 2300/26* (2020.01)

(58) Field of Classification Search
CPC ...... H02J 3/34; H02J 3/16; H02J 3/381; H02J 2300/26; H02J 3/32; H02J 3/36; H02J 3/38; H02M 5/16
See application file for complete search history.

(56) References Cited

U.S. PATENT DOCUMENTS 4,222,097 A    9/1980  Rogowsky
4,649,466 A    3/1987  Rogowsky
(Continued)

FOREIGN PATENT DOCUMENTS

CN    107408819 A    11/2017
DE    2747136 C2    8/1984
(Continued)

OTHER PUBLICATIONS

International Search Report Dated Feb. 3, 2021 for International Application No. PCT/EP2020/082419.

*Primary Examiner* — Thienvu V Tran
*Assistant Examiner* — Yahveh Comas Torres
(74) *Attorney, Agent, or Firm* — Eschweiler & Potashnik, LLC

(57) ABSTRACT

A converter device configured to exchange power between a first grid and a second grid, including a first inverter configured to connect on an AC side thereof to the first grid, and connected on a DC side thereof to a link circuit of the converter device, and a second inverter configured to connect on an AC side thereof to the second grid, and connected on a DC side thereof to the link circuit. The converter device also includes a solar generator connected to the link circuit, a first controller operably coupled to the first inverter and configured to set a specified converter power of the first inverter, and a second controller operably coupled to the second inverter and configured to set a voltage of the link circuit such that a power of the solar generator optimized according to a predetermined criteria.

15 Claims, 2 Drawing Sheets

(51) Int. Cl.
*H02J 3/32* (2006.01)
*H02M 5/16* (2006.01)
*H02J 3/38* (2006.01)

(56) References Cited

U.S. PATENT DOCUMENTS

| | | | | |
|---|---|---|---|---|
| 5,109,327 | A * | 4/1992 | Griffin | H02M 5/14 363/2 |
| 9,477,248 | B2 * | 10/2016 | Murano | G05F 1/67 |
| 10,074,979 | B2 | 9/2018 | Kim et al. | |
| 10,608,434 | B2 | 3/2020 | Adamczyk et al. | |
| 12,074,535 | B2 | 8/2024 | Uda et al. | |
| 2014/0132075 | A1 * | 5/2014 | Fishman | H02J 3/381 307/82 |
| 2014/0183949 | A1 * | 7/2014 | Murano | H02J 3/381 307/24 |
| 2016/0149507 | A1 * | 5/2016 | Lei | H02M 1/12 363/35 |
| 2016/0254665 | A1 | 9/2016 | Hur et al. | |

FOREIGN PATENT DOCUMENTS

| | | | | |
|---|---|---|---|---|
| DE | 3326947 | A1 | 2/1985 | |
| DE | 102008004269 | A1 * | 7/2009 | B60L 11/12 |
| DE | 102014212832 | A1 | 1/2016 | |
| DE | 102015008305 | A1 * | 12/2016 | H02J 7/35 |
| EP | 2190095 | A1 | 5/2010 | |
| EP | 3070805 | A1 * | 9/2016 | H02J 3/18 |
| EP | 3346568 | A1 | 7/2018 | |
| JP | 2017527240 | A | 9/2017 | |
| JP | 2019012380 | A | 1/2019 | |
| JP | 6608105 | B1 | 11/2019 | |
| WO | WO-2016146784 | A1 * | 9/2016 | H02J 3/18 |

* cited by examiner

CONVERTER APPARATUS AND OPERATING METHOD

CROSS REFERENCE TO RELATED APPLICATIONS

This Application is a continuation of International Patent Application number PCT/EP2020/082419, filed on Nov. 17, 2020, which claims priority to German Application number 10 2019 132 336.3, filed on Nov. 28, 2019. The contents of the above-referenced Patent Applications are hereby incorporated by reference in their entirety.

FIELD

The disclosure relates to a converter device for exchanging power between two grids and to a method for exchanging power.

BACKGROUND

It is known to use frequency converters to exchange power between grids that are operated at different frequencies or asynchronously to one another. For this purpose, the power to be transmitted is converted into a DC voltage by a first inverter—or rectifier—and fed into a link circuit. A second inverter draws the power to be transmitted from the link circuit and converts it into AC power that is compatible for feeding into the target grid. In order to ensure stable operating conditions, the power fed into the link circuit must correspond to the power drawn at all times. The inverters involved are therefore often operated in a manner coordinated with one another, for example via a common control device.

It is also known to connect a storage device, for example a battery, to the link circuit via a converter. In this case, the power fed in and drawn from the link circuit must also match with a difference between the power fed in by one inverter and the power drawn by the other inverter being compensated for by the converter and used to charge/discharge the storage device.

Also known is the generation of DC power by solar generators and the feeding of this power by an inverter into a connected AC grid. The inverter is able in this case to maximize the power generated by the solar generators by varying the DC voltage at the solar generators.

Document EP 2 190 095 A1 discloses an energy supply system which is connected to two different grids, for example a railway grid and an AC grid, via two inverters. The inverters are connected via a common DC link grid, to which additional energy generators are also connected. The document does not disclose whether and how a yield from the connected energy generators is to be optimized.

SUMMARY

The disclosure is directed to adding a solar generator to a device for transmitting power between two AC voltage grids that are basically operated independently, and to upgrade the device to control the power generation of the solar generator and to supply the generated power to the two grids either selectively or proportionately. The disclosure is further directed to an operating method for such a device.

In a first embodiment of the disclosure, a converter device configured to exchange power between a first grid and a second grid comprises a first inverter which can be connected to the first grid on the AC side and is connected to a link circuit on the DC side, and a second inverter which can be connected to the second grid on the AC side and is connected to the link circuit on the DC side. The link circuit therefore enables power to be transmitted between the inverters and thus between the grids. A solar generator is connected to the link circuit directly, that is to say without a converter being connected in between. A first controller of the first inverter is configured to set a specified converter power of the first inverter and a second controller of the second inverter is configured to set a voltage of the link circuit such that a power of the solar generator is set as desired. In this case, the set power can be a maximum power (MPP power; MPP=maximum power point).

In this way, a converter device configured to exchange power between grids is upgraded to make the power that can be generated by a solar generator flexibly available to one or both grids without or with minimal additional components. In one embodiment, the solar generator can be dimensioned with a rated power that is between 10% and 100% of the rated power of one of the inverters of the converter device. However, it is also conceivable to equip the solar generator with a rated power of more than 100%, for example with 150% or, in extreme cases, up to 200% of the rated power of one of the inverters of the converter device, whereby the function of the power exchange between the grids can then, however, be impaired depending on the situation or the solar generator has to be curtailed. It is then no longer possible, for example, to draw a desired power from one grid, but PV power is fed into both grids or the solar generator is curtailed by virtue of the link circuit voltage being increased accordingly.

Due to the direct connection of the solar generator to the link circuit, the second inverter can, in one embodiment, maximize the power generated by the solar generator by determining the power of the solar generator, for example using current sensors, and varying the voltage in such a way that it approximates a maximum power MPP (Maximum Power Point) of the solar generator. As an alternative to determining the solar generator power, the second inverter can also determine a change in its own converter power, which results from a self-generated change in the link circuit voltage, in order to approximate the MPP. In this way, no additional current sensors are required. For this purpose, the second inverter can use known MPP tracking algorithms. Depending on the target power value to which the first inverter regulates, different power flows and flow directions can result at the second inverter. The first target power value therefore allows the power generated by the solar generator to be divided flexibly between the two grids. Parallel to this, a desired exchange of power between the two grids can be achieved within the limits of the converter capacity of the inverters involved.

In one embodiment, at least one of the grids has a three-phase design. In one embodiment, both grids have a three-phase design. However, it is also conceivable for one of the grids or even both grids to have a single-phase design.

In one embodiment, a storage device is also connected to the link circuit via a converter. This gives the converter device according to the disclosure additional flexibility with regard to the power flows into the two grids or from the two grids. Power that is generated by the solar generator but is not to be fed into any of the grids at the time of generation or power that is to be taken from the grids can be temporarily transferred to the storage device to allow later feed-in. It is temporarily also possible to increase the sum of the power fed into the two grids by discharging the storage device above the power value generated by the solar generator.

To make the design of the power flows more flexible, the first inverter and the second inverter can have a bidirectional design according to one embodiment.

In one embodiment, a target power value of the inverter operated in a power-regulating manner can be determined as a function of the power flowing via the inverter operated in a voltage-regulating manner. For example, the target power value can be determined as a percentage of the power flowing through the inverter operated in a voltage-regulating manner, for example in order to ensure a fixed percentage distribution of the power generated by the solar generator between the grids. However, it is also possible to only adjust the target power value if the inverter operated in a voltage-regulating manner risks being overloaded.

Another embodiment of the disclosure relates to a method for exchanging power between a first grid and a second grid via a converter device having a first inverter connected to the first grid and a second inverter connected to the second grid, which are connected to each other via a link circuit, wherein a solar generator is connected directly to the link circuit (for example, no intervening converters). The method according to the disclosure comprises a power-regulating operation of the first inverter and link-circuit-voltage-regulating operation of the second inverter. In this case, the link circuit voltage is regulated in such a way that the power of the solar generator is maximized. In this case, the maximization of the solar generator power can also take place temporarily, for example in one of several operating modes. In one embodiment, the second inverter will operate the solar generator in a curtailed manner to avoid overloading when a maximum converter power of the second inverter is reached.

In one embodiment of the disclosure, at least one of the inverters, for example, both inverters, provides reactive power, with the reactive power, for example, being provided as a function of the voltage of the grid connected to the at least one inverter or to the respective inverter. This measure allows the voltage of the grid connected to the at least one inverter or of both grids to be supported.

In one embodiment, the first inverter selects the target power value as a function of the frequency of the grid connected to the inverter, since the grid frequency is an indicator of a power surplus or a power deficit of the grid, which the first inverter can compensate for, or at least reduce for, in this way.

At this point, it should not go unmentioned that the solar generator can also be used in one embodiment as a dump load in another operating mode if, for a short time, one or both grids have a surplus of energy that can be transferred directly to the solar generator by the inverter, for example, by virtue of raising the link circuit voltage above an open circuit voltage of the solar generator.

In one embodiment of the disclosure, for example within an operating mode, the role of the power-regulating operation and the voltage-regulating operation can be swapped between the inverters on the basis of swap criteria. In one embodiment, before the roles are swapped, the solar generator is set to an operating point with a voltage above an MPP voltage of the solar generator. At this operating point, the solar generator power falls when the voltage rises or rises when the voltage falls. If now in a transition phase in which both inverters are operated with a fixed converter power, which corresponds to the converter power immediately before the start of the transition phase, changes in the solar generator power due to changes in irradiation do not require an adjustment of the target values of the fixed converter power of both inverters, such that stable operation of the converter device results within the transition phase. The start and end of the transition phase can be coordinated in one embodiment by communication between the inverters or the associated controllers. The inverter operated in a voltage-regulating manner may initiate the role reversal.

BRIEF DESCRIPTION OF THE DRAWINGS

In the following, the disclosure is illustrated using figures, in which.

DETAILED DESCRIPTION

Figure 1:
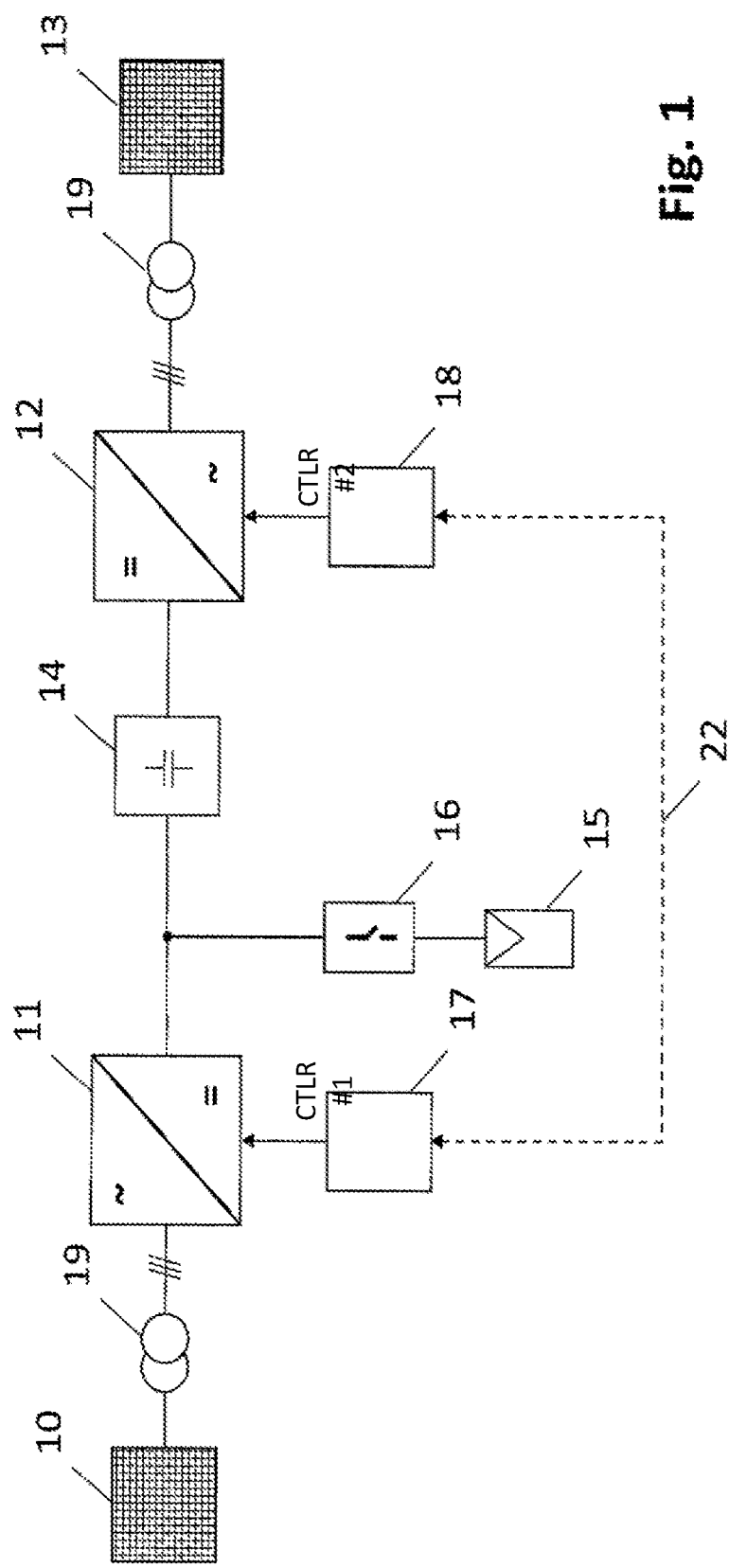
FIG. 1 shows a first embodiment of a converter device according to the disclosure and FIG. 2 shows a second embodiment of a converter device according to the disclosure.

FIG. 1 shows an embodiment according to the disclosure of a converter device comprising a first inverter 11 and a second inverter 12. The first inverter 11 is connected on the AC side via a transformer 19 to a first grid 10, which has a single-phase design in this embodiment. The second inverter 12 is connected on the AC side via a further transformer 19 to a second, here three-phase, grid 13. The transformers 19 are used to adapt the output voltage of the two inverters to the voltage of the grid connected thereto. Both inverters are connected on the DC side to one another via a link circuit 14. In addition, a solar generator 15 is connected to the link circuit 14. The solar generator 15 is connected directly, that is to say without the interposition of a converter, so that the link circuit voltage corresponds to the solar generator voltage and the power generation of the solar generator 15 can be influenced directly by controlling the link circuit voltage. The solar generator 15 can be separated from the link circuit 14, in one embodiment, via a circuit breaker 16. If required, the solar generator 15 can be electrically separated from the link circuit 14 by the circuit breaker 16.

A first controller 17 controls the operation of the first inverter 11, while a second controller 18 controls the operation of the second inverter 12. However, it is also conceivable that both inverters are operated via a common controller in one embodiment.

The first controller 17 is configured to implement a power-regulating operation of the first inverter 11 in that the first inverter 11 feeds a target power into the first grid 10 or draws it from the first grid 10. In one embodiment, the target power can be selected as a function of a frequency of the first grid 10 by storing a power/frequency characteristic curve in the first controller 17, for example. In addition, the first controller 17 can provide a reactive power as a function of the voltage of the first grid 10, for example on the basis of a stored reactive power/voltage characteristic curve. Both options serve to stabilize the first grid 10.

The second controller 18 is configured to implement a link-circuit-voltage-regulating operation of the second inverter 12 in which the second inverter 12 regulates the power exchanged with the second grid 13 in such a way that the link circuit voltage present at the link circuit 14 assumes a target value. Within the framework of this regulation, both a power flow into the second grid 13 and a power withdrawal from the second grid 13 can result. The level and direction of the power flow is influenced both by the target power value currently used at the first inverter 11 and by the power currently being generated by the solar generator 15.

Similar to the first controller 17, the second controller 18 can also provide reactive power, the level and type of which is selected, for example, as a function of the voltage of the second grid 13, with an apparent power limit of the two inverters having to be observed in each case in order to avoid overloading the inverters.

The second controller is also configured to select a target value for the voltage of the link circuit 14 at least in one operating mode in such a way that the power generated by the solar generator 15 is maximized. Known MPP tracking algorithms are suitable for achieving this goal, in which the solar generator voltage or link circuit voltage is changed in steps or continuously and a power change caused by the voltage change is analyzed to achieve a stable link circuit voltage in order to derive further voltage changes from this and to drive the solar generator voltage in the direction toward, or hold, a maximum power point.

In one embodiment, the two controllers are configured to exchange control parameters with one another via a control line 22. These parameters can include target values and/or actual values of the electrical parameters of the respective inverters, for example power, current or voltage values, or contain specific control commands. In this way, one of the controllers can influence the other controller, or both controllers can pursue common regulation goals. However, the control parameters can also be exchanged wirelessly, for example, by radio transmission.

It is possible that the role of the power-regulating controller and the voltage-regulating controller is not permanently assigned to the first controller 17 or the second controller 18, but rather is alternated between the two controllers. The change can be selected on the basis of the operating situation of the converter device, with change criteria being specified for the role change. If the change criteria are met, the role change is carried out, for example, via communication between the two controllers, represented by a dashed line 22. Such a role change can have a short transition phase in which both controllers are operated in a power-regulating manner. At the beginning of the transition phase, the current converter power of the inverter operated in a voltage-regulating manner is selected as the initial target power for the power-regulating operation. At the end of the transition phase, the original power-regulating inverter is switched to voltage-regulating operation.

In one embodiment, before a transition phase, the solar generator 15 can be set to an operating point with a solar generator voltage above a current MPP voltage. As a result, the power/voltage characteristic curve of the solar generator 15 counteracts a voltage change in the transition phase due to a possible incomplete power equalization in the link circuit. It is conceivable that, during the role change, the current MPP voltage of the solar generator 15 is also exchanged as part of the role change communication. This allows an immediate return of the solar generator to its MPP after completing the role change.

In one embodiment, the assignment of the roles as an inverter operated in a power-regulating or a voltage-regulating manner or the change criteria can be selected in such a way that the largest possible control reserve is achieved with regard to fluctuations in the power generated by the solar generator 15 and/or the largest possible control reserve with regard to the grid-stabilizing reaction of the inverters. For example, the role of the inverter operated in a voltage-regulating manner can be assigned to the inverter with the greater rated power.

Both, the first grid 10 and the second grid 13 can have a single-phase or multi-phase, for example, three-phase, design. The number of phases can be the same or different between the two grids. For example, the grid 10 connected to the first inverter 11 can have a three-phase design and the grid 13 connected to the second inverter 12 can have a single-phase design.

Figure 2:
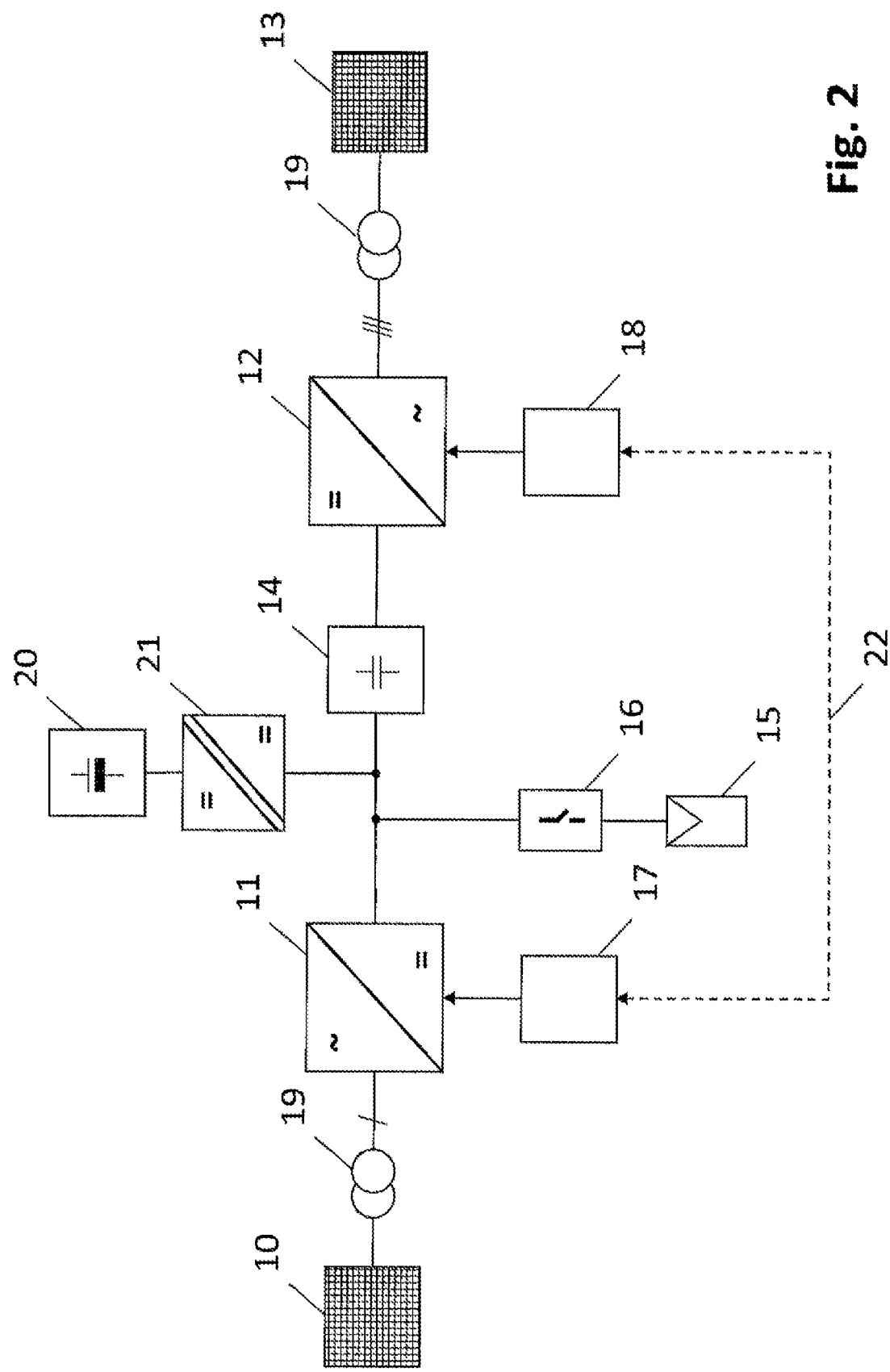

Another embodiment of the converter device according to the disclosure is shown in FIG. 2. Compared to the embodiment from FIG. 1, the converter device is supplemented by a storage device 20 which is also connected to the link circuit via a converter 21. The converter 21 is configured in one embodiment as a DC-isolating converter in order to operate the storage device 20 in a manner isolated from the link circuit 14 for reasons of operational safety. Furthermore, both grids 10, 13 have a three-phase design in the embodiment of FIG. 2.

In one embodiment, the converter 21 is controlled in such a way that a desired exchange power that is constant at least for a period of time is exchanged between the link circuit 14 and the storage device 20. In this way, the connection of the storage device 20 to the link circuit 14 has no or no significant influence on the finding of an operating point of maximum power by the voltage-regulating inverter. However, it is also conceivable that the converter 21 is temporarily operated in a voltage-regulated manner, for example, during an operating mode in which both inverters are operated in a power-regulating manner, for example during the transition phase described above. In such an operating mode or phase, the converter 21 can keep the link circuit voltage stable so that, for example, the solar generator remains at the MPP or its other operating point.

The operating methods described for the embodiment of the converter device according to the disclosure of FIG. 1, for example, with regard to MPP tracking, role change and reactive or active power provision for grid support, can also be used in the embodiment of the converter device according to the disclosure of FIG. 2. The storage device 20 in this case increases the feasibility for grid support by providing additional control reserves for a necessary short-term power requirement.

What is claimed is:

1. A converter device configured to exchange power between a first grid and a second grid, comprising:
    a first inverter configured to connect on an AC side thereof to the first grid, and connected on a DC side thereof to a link circuit of the converter device,
    a second inverter configured to connect on an AC side thereof to the second grid, and connected on a DC side thereof to the link circuit,
    a solar generator connected to the link circuit,
    a first controller operably coupled to the first inverter and configured to set a specified converter power of the first inverter, and
    a second controller operably coupled to the second inverter and configured to set a voltage of the link circuit such that a power of the solar generator is optimized according to a predetermined criteria.

2. The converter device as claimed in claim 1, wherein at least one of the first grid and the second grid comprises a three-phase design.

3. The converter device as claimed in claim 1, wherein the first grid comprises a single-phase design.

4. The converter device as claimed in claim 1, wherein the first controller and the second controller are configured to exchange control parameters with one another.

5. The converter device as claimed in claim 1, further comprising a storage device operably coupled to the link circuit via a DC/DC converter.

6. The converter device as claimed in claim 1, wherein the first inverter and the second inverter have a bidirectional power flow design.

7. The converter device as claimed in claim 1, wherein the solar generator is configured to operate at a rated power which is between 10% and 200% of the rated power of one of the first and second inverters of the converter device.

8. The converter device as claimed in claim 1, wherein the predetermined criteria comprises a maximization of power of the solar generator.

9. A method for exchanging power between a first grid and a second grid via a converter device comprising a first inverter connected to the first grid and a second inverter connected to the second grid, wherein the first inverter and the second inverter are connected to each other via a link circuit, wherein the converter device further comprises a solar generator connected to the link circuit, the method comprising:
- operating the first inverter in a power-regulating operation; and
- operating the second inverter in a link-circuit-voltage-regulating operation, wherein a link circuit voltage is regulated by the second inverter to satisfy a predetermined power criteria of the solar generator.

10. The method as claimed in claim 9, wherein the second inverter is configured to operate the solar generator in a curtailed manner when a maximum converter power of the second inverter is reached as the predetermined power criteria.

11. The method as claimed in claim 9, wherein at least one of the first inverter and the second inverter provides reactive power, wherein the reactive power is provided as a function of a voltage of the first grid or second grid, respectively, connected to the at least one of the first inverter and the second inverter.

12. The method as claimed in claim 9, wherein the first inverter is configured to select a power as a function of a frequency of the first grid connected to the first inverter.

13. The method as claimed in claim 9, further comprising swapping an operation of the power-regulating operation and the link-circuit-voltage-regulating operation between the first inverter and the second inverter based on a swap criteria.

14. The method as claimed in claim 13, further comprising, before swapping the operation of the first inverter and the second inverter, setting an operating point of the solar generator with a voltage above an MPP voltage of the solar generator.

15. The method as claimed in claim 9, wherein operating the second inverter in the link-circuit-voltage-regulating manner comprises specifying a target power value of the first inverter operating in the power-regulating manner as a function of the power flowing via the second inverter operating in the voltage-regulating manner.

* * * * *